United States Patent [19]

Favreau

[11] 3,816,655

[45] June 11, 1974

[54] OPTICAL DEVICE FOR TELECINE SYSTEMS

[75] Inventor: Michel Favreau, Paris, France

[73] Assignee: Thomson-CSF, Paris, France

[22] Filed: Oct. 3, 1972

[21] Appl. No.: 294,514

[30] Foreign Application Priority Data

Oct. 29, 1971 France .............................. 71.39038

[52] U.S. Cl............ 178/7.88, 178/DIG. 28, 350/169

[51] Int. Cl.......................... G02b 27/10, H04n 5/84

[58] Field of Search........... 178/7.88, 7.89, DIG. 28; 350/169, 171, 172, 174

[56] References Cited

UNITED STATES PATENTS 2,823,256 2/1958 Sachtleben.................. 178/DIG. 28

3,290,437 12/1966 Goldmark.................... 178/DIG. 28

*Primary Examiner*—Howard W. Britton

*Attorney, Agent, or Firm*—Cushman, Darby & Cushman

[57] ABSTRACT

In a twin-path optical device a telecine system carrying out interlaced scanning by means of a flying spot scanning tube, the two paths, defined for example by means of fixed mirrors respectively terminate on the two opposite faces of one and the same sector of a rotary mirror with alternate reflecting and transparent sectors.

Two images of the scanned field described by the light spot of the tube are alternately obtained, by means of a single projecting lens alternately receiving the light transmitted by, and the light reflected by, the rotary mirror.

3 Claims, 2 Drawing Figures

OPTICAL DEVICE FOR TELECINE SYSTEMS

The present invention relates to an optical device for a continuous-run telecine system, which device, in order to effect second order interlacing, employs a flying spot scanning tube and a twin optical channel arrangement.

In telecine systems of this kind, a twin-channel optical device makes it possible to obtain from a spot carrying out a single scanning of the screen of the scanning tube, two separate scanned fields for the scanning of the film frames; these two fields, the even and odd fields, are spacially offset due to the twin-optical channel arrangement and are sequentially selected for scanning the film, by a shutter operated synchronously with the scanning function. The offset of the fields at the level of the film being scanned, amounts to half a film pitch (the film pitch designating the standard interval separating the centres of two successive film frames).

There are various ways of designing the twin-channel optical device.

Devices of a first type comprise two identical projection lenses arranged in parallel and associated with two prisms; these prisms, at the level of the film being scanned, bring the two images of the spot to a centre-to-centre distance corresponding to half the film pitch. In these devices, each projection lens is operating at full aperture and although the optical efficiency is therefore good, the separation between the two prisms does not make it possible to fully scan the height of cinemascope film frames, these being contiguous.

Devices of a second, older type, comprise two half projection lenses superimposed upon one another, thus obviating the need for prisms. The interface between the two optical channels is not such a cause of disturbance as with the device which uses prisms, but at this location there is still a substantial residual differential spot, due to a scintillation phenomenon whose amplitude is a source of extreme nuisance, it being impossible in effect to obtain identical illumination of all the homologous parts of the two fields. These latter devices have been abandoned because of their low-luminosity, the problems of manufacture of the two half projection lenses and the scintillation phenomenon arising out of the fact that it is impossible to make the images of the exit pupils of the two half projection lenses strictly coincide at the level of the photomultipliers.

The object of the present invention is a novel twin-channel optical device which makes it possible to overcome the drawbacks of the known devices.

According to the invention, there is provided an optical device for a telecine system carrying out interlaced scanning by means of a flying spot scanner, said optical device comprising two optical channels having separate initial sections and a common terminal section including a single projection lens, the initial sections of said two channels comprising means for supplying to said projection lens, for one and the same position of the flying spot, two object points constituted by two images of said spot the locations of which are derived from one another by a translatory motion parallel to the direction of vertical scanning.

Other features will become apparent and the invention better understood, from a consideration of the ensuing description which is given by way of non-limitative example with reference to the appended drawings in which.

Figure 1:
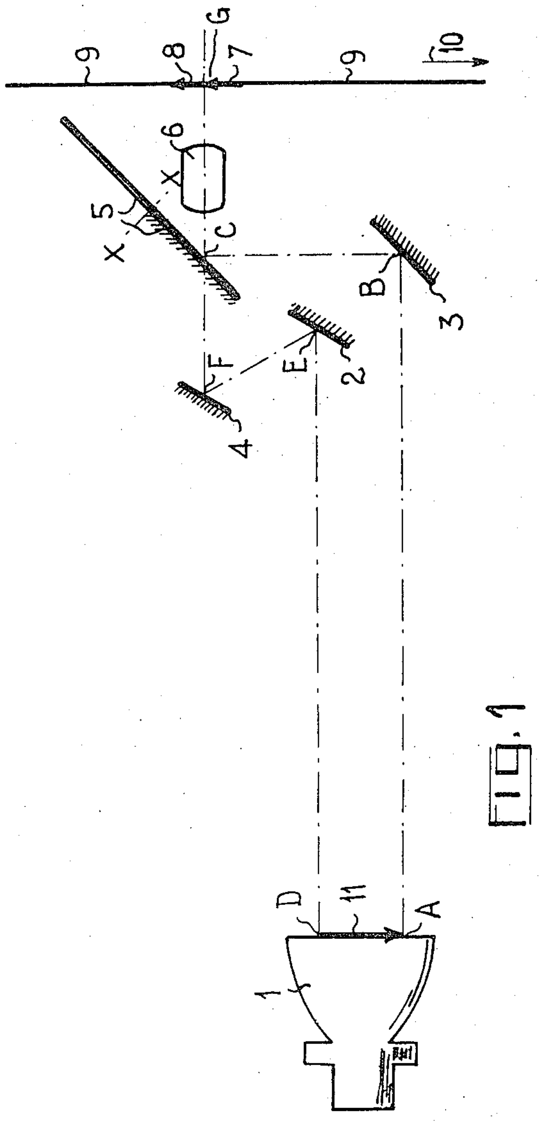
FIG. 1 is the simplified diagram of an embodiment of the twin channel optical system in accordance with the invention.

In FIG. 1, the scanner tube 1 and part of the optical system of a telecine system with a twin-channel optical system and continuous film transfer, have been shown. The direction and amplitude of the single scanning operation carried out on the screen of the tube 1 by the spot derived from the electron beam emitted by the cathode of the said tube, have been indicated by an arrow 11.

The optical portion represented, comprises four mirrors 2, 3, 4 and 5, and a projection lens 6. The mirrors 2, 3, 4, are fixed, and the mirror 5 is imparted a rotational motion, about its own axis XX, by a drive system which has not been shown in the drawing.

In FIG. 1, there has likewise been illustrated a film 9 which unreels in the direction of the arrow 10. Two superimposed arrows 7 and 8 symbolise upon the film 9 the position, direction and amplitude of the odd and even field-scan operations on said film. These fields are derived from the field symbolised by the arrow 11 as indicated hereinbefore.

The mirror 5 is made up of alternate reflective and transparent sectors.

When, during its rotational movement, the mirror 5 presents a reflective sector to the light issuing from the scanning spot on the screen of the tube 1 and reflected by the mirror 3, an optical channel is defined by the mirrors 3 and 5 and the projection lens 6. The trajectory of this light fraction is such that an image of the spot is formed in the plane of the film 9 and thus results in odd scanning as symbolised by the arrow 7; by contrast, if a transparent sector is presented to the trajectory of the light issuing from the spot and reflected by the mirror 3, this light does not give rise to a spot image in the plane of the film 9.

On the other hand, if the mirror 5 presents a reflective sector to a light fraction issuing from the spot and reflected by the mirror 3, it presents the reverse of this face to the light fraction issuing from the spot and successively reflected by the mirrors 2 and 4, thus preventing it from reaching the projection lens 6.

Conversely, if during its rotational movement, the mirror 5 presents a transparent sector to the light fraction issuing from the spot and reflected by the mirrors 2 and 4, the optical channel constituted by the mirrors 2 and 4 and the projection lens 6, will cause this light fraction to follow a trajectory such that an image of the spot is formed in the plane of the film 9, this resulting in even scanning as symbolised by the arrow 8.

In FIG. 1, two rays ABCG and DEFCG, issuing normally to the face of the tube 1 in respect of two extreme positions of the spot, have been illustrated in order in particular to show the common portion CG of the trajectory, which enables the single projection lens 6 to be used.

The positions of the various elements of FIG. 1 and the characteristics of the projection lens, are such that the even and odd scanned fields are precisely superimposed in the plane of the film 9 and that their respective heights are equal to half a frame pitch.

In order for the system thus described to operate correctly, self-evidently the rotation of the mirror 5 around its axis XX must be synchronised with the scanning function of the tube 1.

A variant embodiment of the device in accordance with the invention is shown in FIG. 2 again showing the tube 1, its scanning being symbolised by the arrow 11, the mirror 5 with its axis of rotation XX, the projection lens 6, the film 9 whose direction of continuous displacement is indicated by the arrow 10, the direction and amplitude of the odd and even field scan functions being given by the arrows 7 and 8. In this variant embodiment, the light emitted by the spot scanning the screen of the tube 1 is, in respect of an odd field, reflected by the mirror 5 alone. In the case of even fields, a single mirror 2 reflects through the transparent sectors of the mirror 5, the light coming from the spots scanning the screen, in order to produce the scanning function symbolised by the arrow 8.

Two rays AMG and DNMG, issuing normally to the face of the tube 1 in respect of two extreme positions of the spot, have been shown, illustrating the common part MG of the trajectory.

The use of four mirrors, as shown in FIG. 1, makes it possible to equalise the length of the two optical trajectories or channels, and consequently the magnifications. This is another way of saying that the two optical channels should be such that they can supply the projection lens 6, for one and the same position of the moving spot, two object points constituted by two images of said spot which may be deduced from one another by a translatory motion parallel to the direction of field scan on the film being analysed.

Figure 2:
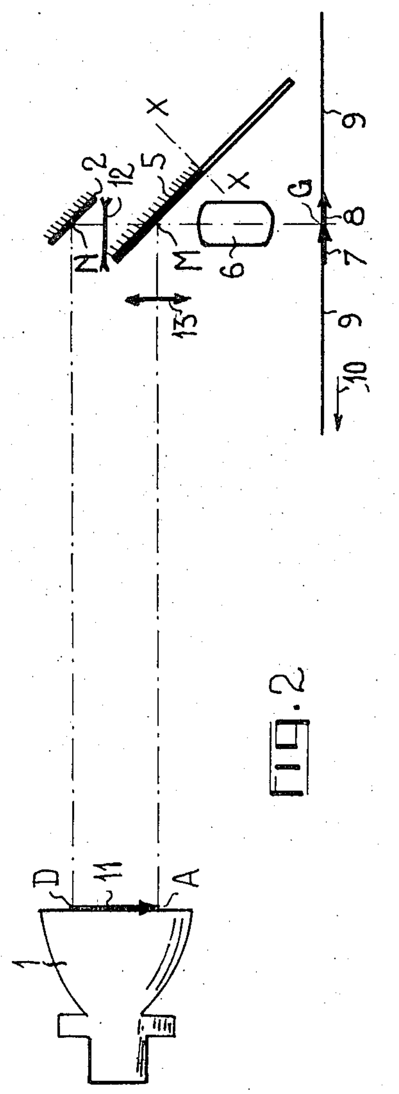
FIG. 2 is a simplified diagram of another embodiment in accordance with the invention.

In the case shown in FIG. 2, the optical trajectories have different lengths and a correction is necessary to compensate for the variation in magnification which results from this fact. This correction can be effected by a divergent lens 12 arranged in the longer optical channel or trajectory, or by means of a convergent lens 13 arranged in the shorter optical channel or trajectory. The optical correction can equally well be shared between the two channels by the use of a lens such as lens 12 and a lens such as lens 13. It is furthermore possible to reduce the difference between the two optical trajectories by replacing the mirror 2 by a prism of high index, thus reducing the apparently longer trajectory.

Self-evidently, other embodiments of the invention may be devised by those skilled in the art. For example, the mirror 5, instead of rotating about its own axis XX, may oscillate about this axis, or the rotary mirror 5 may be replaced by a fixed, splitting mirror, it being necessary in this latter case to utilise a shutter for the sequential selection of the two channels or trajectories, this shutter possibly, as is generally the case in conventional telecine systems, being constituted by a screen containing windows and displacing parallel to the film in the opposite direction to the latter.

What is claimed, is:

1. An optical device for a telecine system carrying out interlaced scanning by means of a flying spot scanner, said optical device comprising: first and second optical channels having separate initial sections and a common terminal section including a single projection lens; means, inserted in the initial section of said first channel, for forming a first image of the flying spot of said scanner; means inserted in the initial section of said second channel for forming a second image of said flying spot; and an optical switch, on which said initial sections terminate, mounted for angular displacement about an axis and having transparent and reflective portions, for, according to its position about said axis, either (i) transmitting the light beam from said initial section of said first channel toward said lens and the light beam from said initial section of said second channel away from said lens or (ii) transmitting the light beam from said initial section of said second channel toward said lens and the light beam from said initial section of said first channel away from said lens.

2. An optical device as claimed in claim 1, wherein said optical switch is formed by the assemblage in a plane of *n* reflective sectors alternating with *n* transparent sectors, *n* being a positive integer and wherein said assemblage is mounted for rotating about said axis in said plane.

3. An optical device as claimed in claim 1, wherein said optical switch is formed by the assemblage in a plane of a reflective sector and a transparent sector and wherein said assemblage is mounted for oscillating about said axis in said plane.

* * * * *